United States Patent Office 3,406,605
Patented Oct. 22, 1968

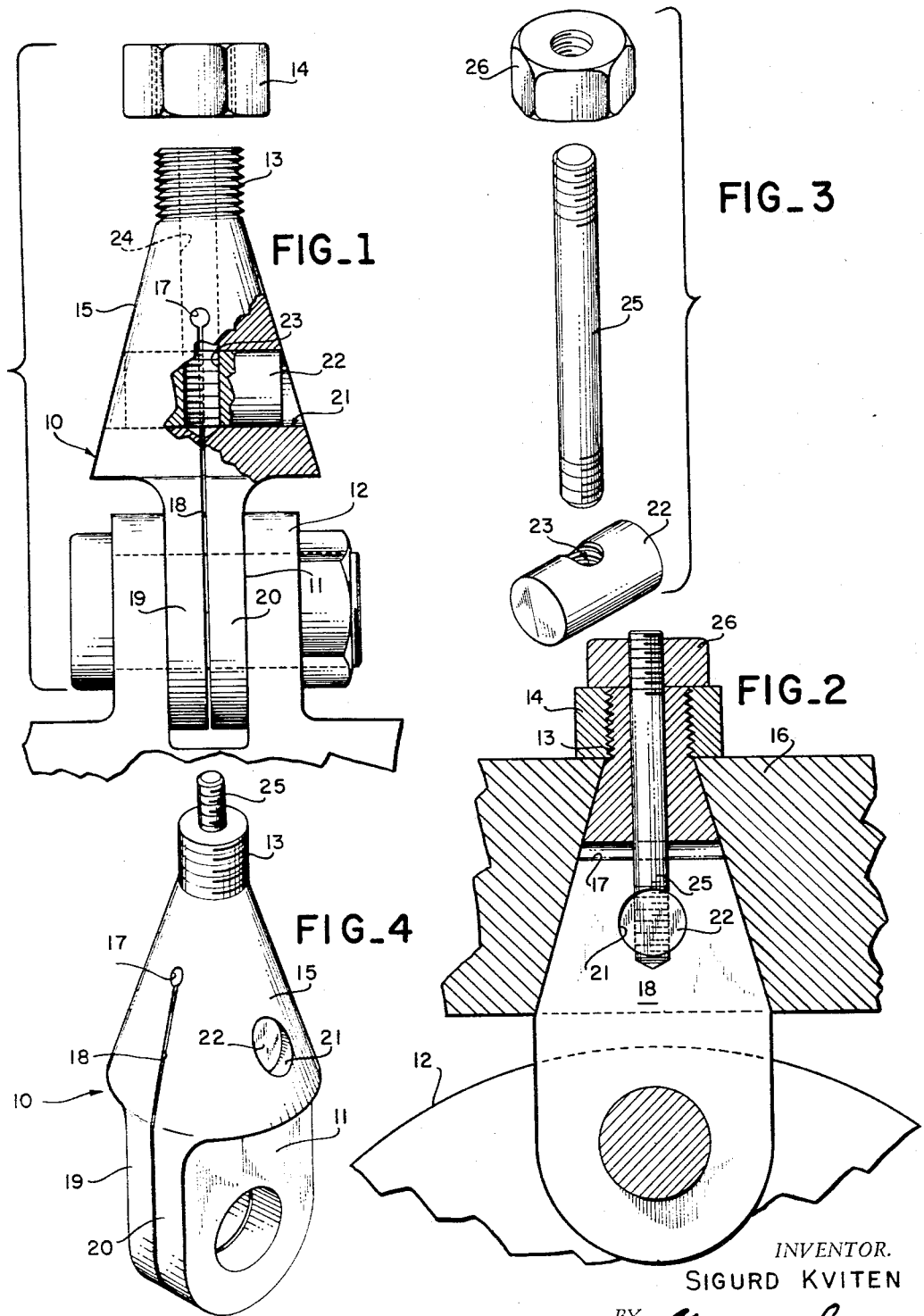

3,406,605
BOLT WITH MULTIPLE LOAD PATHS
Sigurd Kviten, Smyrna, Ga., assignor to Lockheed
Aircraft Corporation, Burbank, Calif.
Filed Dec. 9, 1966, Ser. No. 600,458
8 Claims. (Cl. 85—1)

This invention relates to bolts as employed in the immovable interconnection of parts and more particularly to such a bolt that is characterized by a shank designed and adapted to provide, when operatively assembled and installed, multiple load paths whereby the bolt is capable of sustaining a failure without impairing its connecting function as long as at least one load path remains intact.

In critical applications where conditions dictate the use of a single bolt to form a connection, insurance against failure has been obtained by means of and through the use of "add-on" devices for providing an alternate or secondary load path that will take over the function of the primary load path should the bolt fail. Such devices invariably produce a less direct load path than the ones they replace and transmit the load more in bending and less axially and often less in shear than does the primary structure. This change in loading characteristics and shape makes the structure establishing the secondary load path considerably heavier for matching strength—as compared to the structure of the primary load path—without attaining comparable rigidity. With the load distributed relative to rigidity, it is not uncommon that a secondary load path, in spite of its weight, does not carry any load or serve any function until the primary structure has failed. The ideal situation is when the secondary load path is not just a stand-by structure but can be counted on as part of the primary structure as well.

Consider for example the mount for an engine carried externally on an aircraft. These mounts are effected through one or more bolts that essentially form a rigid connection between the engine at one end and a pylon carried by a major component of the aircraft at the other end. To facilitate such assembly, tapered fittings (commonly referred to as "cone bolts") have been employed. The cone bolt virtually eliminates any alignment problem and at the same time assures a close tolerance through an interference or snug fit of the mating parts so as to produce the desired rigid and immovable connection.

Fail-safe requirements for aircraft, however, dictate additional attachments in the event of bolt failure to assure against loss of the engine. This has resulted in secondary or back-up mounting provisions, none of which has proven acceptable for a number of reasons. Among the principal objections to such prior mounting provisions are the additional installation complications to ensure the proper assembly, the time involved in perfecting such installations, and the extra weight as well as cost of the ultimate assembly.

The present invention is, therefore, directed primarily toward satisfying the fail-safe requirements of bolts in the above and similar applications without the attending shortcomings and objections such as those mentioned above. To this end, it is proposed to redesign a conventional bolt so as to include in effect integral, multiple, uninterrupted load paths all of which normally contribute toward the maximum load-carrying capability of the bolt. At the same time, each such load path is capable of sustaining a lesser load, but a load within the expected requirements of the bolt in an emergency or under conditions less than the severest for which the bolt was designed and constructed.

More specifically, the bolt herein contemplated includes a shank that is slotted longitudinally from one end thereof to a selected point short of, but preferably proximate, the other end. The shank is further pierced transversely by a hole that intersects (ideally at right angles to the plane of) such slot and is adapted to communicate with an axial bore extending from the other end of the bolt. Preferably, this axial bore extends beyond the transverse hole and terminates appreciably short of the opposite or lug end of the bolt.

The ends of the bolt are each adapted to engage and secure, following conventional practice, the respective parts to be interconnected thereby. A plug located in the transverse hole in the bolt is tapped and threaded to align with the axial bore and thereby receive and engage one end of a stud bolt when disposed in the bore. Thus, this plug is adapted to act in opposition to a nut on the other end of the stud that projects beyond the associated end of the bolt as well as the part to be joined thereby.

In the ultimate installation, the longitudinal slot is designed and intended to establish discrete load paths for the extent of the slot. Similarly, the stud and the shank of the cone bolt surrounding the stud (like a tube) establish discrete load paths for the extent of the stud. The stud and the slot overlap to ensure dual load paths for the full length of the bolt.

With the above and other objects in view as will be apparent, this invention consists in the construction, combination and arrangement of parts all as hereinafter more fully described, claimed, and illustrated in the accompanying drawings wherein:

FIGURE 1 is a front elevation with parts broken away of a bolt designed and constructed in accordance with the teachings hereof in an unassembled condition and partly exploded to facilitate an understanding of the coaction of the several bolt components and a fragment of a structural member, such as for example the mount for an external engine for aircraft, to be connected thereby;

FIGURE 2 is a longitudinal section thereof in the fully assembled condition and including a fragment of another structural member, such as for example a pylon, to be connected thereby and through which the externally mounted engine is immovably connected to the aircraft;

FIGURE 3 is an isometric view in exploded form of the transversely disposed plug and the associated stud and nut by which a discrete load path is established at one end of the bolt; and FIGURE 4 is an isometric view of the bolt assembly prior to installation and with its coacting nuts removed.

Referring more particularly to the drawings, 10 designates a bolt terminating at one end in a lug 11 adapted to engage and connect a mount for the external engine of an aircraft, through a clevis 12 in any conventional manner, for example a bolt and nut, shown generally. At its other end, the bolt 10 terminates in a threaded neck 13 adapted to coact in the usual fashion with a nut 14. Medially, the bolt 10 is generally conical as at 15 to correspond to a similarly shaped opening in an associated supporting member or pylon 16. The bolt 10 and connected engine 12 are thereby secured to the pylon 16 through an interference fit of the conical surfaces working in opposition to the nut 14.

Medially of its length, the bolt 10 is pierced transversely by a relatively small hole 17 and a longitudinal slot 18 extends from the hole 17 to the outer or lug end of the bolt 10. Preferably, the hole 17 and slot 18 are along the longitudinal center line of the bolt 10 to thereby provide identical and symmetrical bolt halves 19 and 20.

Outwardly of the hole 17, the bolt 10 is additionally pierced by a relatively large transverse hole 21 which extends at right angles to the plane of the slot 18. A plug 22 is adapted to be located, preferably by press fit, in the hole 21. This plug 22 is provided with a transverse bore 23 which, when the plug is disposed as aforesaid in the hole 21, aligns with an axial bore 24 in the bolt 10 extending from the inner or threaded end 13 thereof to a point medially of the bolt and preferably outwardly beyond the hole 21. The bore 23 is threaded so as to receive one end of a stud bolt 25 disposed in the bore 24 whereby the stud 25 is secured in and forms, in effect, an integral part of the bolt 10. At its other end, the stud 25 extends beyond the threaded neck 13 thereof and the nut 14 when driven home so as to coact in conventional manner with a nut 26 acting in opposition to the plug 22 and maintaining the stud 25 and plug 22 in integral assembly with the bolt 10.

In view of the foregoing, it is apparent that when the bolt 10 with plug 22 therein is disposed with its conical surface 15 in flush abutment against the complemental surface of the pylon 16 and the nuts 14 and 26 threaded tightly thereon, the engine is secured rigidly in position on its support or pylon 16. In the event of a failure in the bolt 10 across either of the longitudinal halves 19 or 20 or adjacent the inner, uninterrupted end thereof, the symmetrically distributed load path through the bolt 10 will be eliminated. The connection will nevertheless be maintained through the surviving bolt half 19 or 20 or through the stud 25. Thus, before a separation between the engine 12 and its support or pylon 16 can be effected, a multiple bolt failure through both halves 19 and 20 or through the stud 25 and the surrounding conical portion of the bolt 10 must occur. Until such total failure of the bolt 10, it will remain functional as a connector between the engine 12 and pylon 16 if only under loads less than the severest for which the connector has been designed.

While a particular embodiment of the invention has been herein illustrated and described, numerous variations and alterations will occur to those skilled in the art without departing from the true spirit and scope of this invention. The appended claims are intended to cover all such modifications and constitute the only limitations to be placed on the invention.

What is claimed is:

1. A bolt adapted to engage and secure parts against relative movement comprising a shank, engagement means adjacent opposite ends of said shank for coaction with corresponding means carried by the parts to be connected, a longitudinal slot extending from one end of said shank to a selected point short of the other end thereof, a transverse hole piercing said shank and intersecting said slot, an axial bore extending from said other end of said shank and communicating with said transverse hole, a plug filling said transverse hole, a threaded hole in said plug adapted to align with said axial bore when the plug is located as aforesaid, and a stud threaded at opposite ends adapted to pass through said axial bore and coact at one end with said threaded hole and at the other end with a nut.

2. The bolt of claim 1 wherein said engagement means includes a surface on one end of said shank adapted to coact with a corresponding surface carried by one of said parts.

3. The bolt of claim 1 wherein said selected point is proximate said other end.

4. The bolt of claim 1 wherein said axial bore extends beyond said transverse hole and terminates short of said one end.

5. The bolt of claim 1 wherein said plug is press fitted within said transverse hole.

6. The bolt of claim 1 wherein said engagement means includes a thread and nut at said other end and a lug pierced transversely at said one end.

7. The bolt of claim 6 including a conical surface formed on said shank adjacent the threaded end aforesaid for coaction with a complemental surface on one of said parts to thereby act in opposition to the nut on said threaded end.

8. The bolt of claim 1 wherein the plane of said transverse hole is at right angles to the plane of said slot.

References Cited
UNITED STATES PATENTS 1,018,741   2/1912   Davis _____ 85—1

FOREIGN PATENTS 542,463   1/1932   Germany.

EDWARD C. ALLEN, *Primary Examiner.*